US009947939B2

(12) United States Patent
O'Malley et al.

(10) Patent No.: US 9,947,939 B2
(45) Date of Patent: Apr. 17, 2018

(54) USE OF AN ANODE CATALYST LAYER

(71) Applicant: JOHNSON MATTHEY FUEL CELLS LIMITED, London (GB)

(72) Inventors: Rachel Louise O'Malley, Berkshire (GB); Enrico Petrucco, Berkshire (GB)

(73) Assignee: Johnson Matthey Fuel Cells Limited, London (GB)

( * ) Notice: Subject to any disclaimer, the term of this patent is extended or adjusted under 35 U.S.C. 154(b) by 172 days.

(21) Appl. No.: 14/765,699

(22) PCT Filed: Jan. 29, 2014

(86) PCT No.: PCT/GB2014/050228
§ 371 (c)(1),
(2) Date: Aug. 4, 2015

(87) PCT Pub. No.: WO2014/122428
PCT Pub. Date: Aug. 14, 2014

(65) Prior Publication Data
US 2015/0372315 A1    Dec. 24, 2015

(30) Foreign Application Priority Data
Feb. 5, 2013  (GB) .................................. 1302014.4

(51) Int. Cl.
| H01M 4/92 | (2006.01) |
| H01M 8/1004 | (2016.01) |
| H01M 4/86 | (2006.01) |
| B01J 21/18 | (2006.01) |
| B01J 23/648 | (2006.01) |
| B01J 37/02 | (2006.01) |
| H01M 8/1018 | (2016.01) |
| B01J 23/46 | (2006.01) |
| H01M 4/88 | (2006.01) |

(52) U.S. Cl.
CPC ............ H01M 4/921 (2013.01); B01J 21/18 (2013.01); B01J 23/6484 (2013.01); B01J 23/6486 (2013.01); B01J 37/0201 (2013.01); H01M 4/86 (2013.01); H01M 4/925 (2013.01); H01M 8/1004 (2013.01); H01M 8/1018 (2013.01); B01J 23/466 (2013.01); H01M 4/881 (2013.01); H01M 4/8828 (2013.01); H01M 4/8842 (2013.01); H01M 4/926 (2013.01); H01M 2004/8684 (2013.01); H01M 2008/1095 (2013.01); H01M 2250/20 (2013.01); H01M 2300/0082 (2013.01); Y02E 60/521 (2013.01); Y02T 90/32 (2013.01)

(58) Field of Classification Search
CPC .................................................... B01J 23/466
See application file for complete search history.

(56) References Cited

U.S. PATENT DOCUMENTS

| 5,482,680 A | 1/1996 | Wilkinson et al. |
| 5,856,036 A * | 1/1999 | Smotkin .................. B01J 23/42 204/293 |
| 6,165,636 A | 12/2000 | Giallombardo et al. |
| 6,379,834 B1 | 4/2002 | Giallombardo et al. |
| 2003/0005966 A1 | 3/2003 | Kourtakis |
| 2004/0087441 A1 | 5/2004 | Bock et al. |
| 2006/0172179 A1* | 8/2006 | Gu ......................... B82Y 30/00 429/482 |
| 2008/0073134 A1* | 3/2008 | Hwang .................... B01J 23/42 502/104 |
| 2009/0061276 A1 | 3/2009 | Tamura |
| 2010/0234210 A1 | 9/2010 | Kawamura et al. |
| 2013/0330651 A1* | 12/2013 | Thompsett .......... H01M 4/8647 429/482 |
| 2014/0220475 A1 | 8/2014 | Pietrasz |
| 2015/0372315 A1* | 12/2015 | O'Malley ........... H01M 8/1018 429/482 |
| 2016/0006041 A1 | 1/2016 | O'Malley |

(Continued)

FOREIGN PATENT DOCUMENTS

| CA | 1305212 | 7/1992 |
| CN | 1937293 | 3/2007 |
| CN | 101019256 | 8/2007 |

(Continued)

OTHER PUBLICATIONS

McKee (D. W. McKee and A. J. Scarpellino Jr., "Electrocatalysts for Hydrogen/Carbon Monoxide Fuel Cell Anodes", Electrochem. Tech., 6 (1968), p. 101).*
China First Office Action dated Dec. 28, 2016; Application No. 201480007465.8.
Papageorgopoulos D C et al: "The inclusion on Mo, Nb and Ta in Pt and PtRu carbon supported electrocatalysts in the quest for improved CO tolerant PEMFC anodes", Electrochemica Acta, Elsevier Science Publishers, Barking, GB, vol. 48, No. 2, Nov. 21, 2010, pp. 197-204, XP004391814, ISSN: 0013-4686, DOI: 10.1016/S0013-4686(02) 00602-3.

(Continued)

*Primary Examiner* — Jeremiah R Smith
(74) *Attorney, Agent, or Firm* — Baker & Hostetler LLP

(57) ABSTRACT

A method of operating a fuel cell having an anode, a cathode and a polymer electrolyte membrane disposed between the anode and the cathode, includes feeding the anode with an impure hydrogen stream having low levels of carbon monoxide up to 5 ppm, and wherein the anode includes an anode catalyst layer including a carbon monoxide tolerant catalyst material, wherein the catalyst material includes: (i) a binary alloy of PtX, wherein X is a metal selected from the group consisting of rhodium and osmium, and wherein the atomic percentage of platinum in the alloy is from 45 to 80 atomic % and the atomic percentage of X in the alloy is from 20 to 55 atomic %; and (ii) a support material on which the PtX alloy is dispersed; wherein the total loading of platinum group metals (PGM) in the anode catalyst layer is from 0.01 to 0.2 mgPGM/cm$^2$.

15 Claims, 1 Drawing Sheet

(56) References Cited

U.S. PATENT DOCUMENTS

2016/0126561 A1    5/2016   O'Malley

FOREIGN PATENT DOCUMENTS

| | | |
|---|---|---|
| CN | 101411011 | 4/2009 |
| CN | 101436669 | 5/2009 |
| CN | 101773826 | 7/2010 |
| GB | 2242203 A | 9/1991 |
| JP | H10-74523 | 3/1998 |
| JP | H10-162839 | 6/1998 |
| JP | 200256874 | 2/2002 |
| KR | 1020120140295 A | 12/2012 |
| WO | 95/08850 A1 | 3/1995 |
| WO | 2005/117172 A2 | 12/2005 |
| WO | 2006005724 A2 | 1/2006 |
| WO | WO2006088194 A1 | 8/2006 |
| WO | 2007/119634 A1 | 10/2007 |
| WO | WO2006/038676 A1 | 8/2008 |
| WO | 2010/124196 A2 | 10/2010 |
| WO | WO2011/038907 A2 | 4/2011 |
| WO | WO 2012/080726 * | 6/2012 .......... H01M 4/8657 |

OTHER PUBLICATIONS

D A Stevens et al: "Characterization and PEMFC Testing of Pt[sub 1-x]M [sub x](M=Ru,Mo,Co,Ta,Au,Sn) Anode Electrocatalyst Composition Spreads", Journal of the Electrochemical Society, vol. 154, No. 6, Jan. 1, 2007, p. B566, XP055115361, ISSN: 0013-4651, DOI: 10.1149/1.2724591.

De-los-Santos-Alvarez N et al: "CO tolerance of ordered intermetallic phases", Journal of Electroanalytical Chemistry and Interface Electrochemistry, Elsevier, Amsterdam, NL, vol. 626, No. 1-2, Feb. 15, 2009, pp. 14-22, XP025924925, ISSN: 0022-0728, DOI: 10.1016/J.JELECHEM.2008.10.028 [retrieved on Nov. 13, 2008].

Garcia G et al: "CO tolerant catalysts for PEM fuel cells", Catalysis Today, Elsevier, NL, vol. 116, No. 3, Aug. 16, 2006, pp. 415-421, XP027975861, ISSN: 0920-5861 [retrieved on Aug. 15, 2006].

Kawatsu S: "Advanced PEFC development for fuel cell powered vehicles", Journal of Power Sources, Elsevier SA, CH, vol. 71, No. 1-2, Mar. 15, 1998, pp. 150-155, XP004112436, ISSN: 0378-7753, DOI: 10.1016/S0378-7753(97) 02740-7.

International Search Report, dated Jun. 3, 2014, from corresponding PCT application.

GB Search Report, dated May 13, 2013, from corresponding GB application.

Written Opinion, from corresponding PCT/GB2014/050229 application.

Written Opinion, from corresponding PCT/GB2014/050228 application.

Written Opinion, from corresponding PCT/GB2014/050227 application.

Baschuk et al., "Carbon Monoxide Poisoning of Proton Exchange Membrane Fuel Cells", International Journal of Energy Research, 25, pp. 695-713, 2001.

Jennings et al., Electronic Properties of Pt-Ti Nanoalloys and the Effect on Reactivity for Use in PEMFCs, The Journal of Physical Chemistry, 116, pp. 15241-15250, 2012.

Office Action issued in U.S. Appl. No. 14/765,679, dated Jun. 2, 2017.

Office Action issued in U.S. Appl. No. 14/765,721, dated Jun. 15, 2017.

* cited by examiner

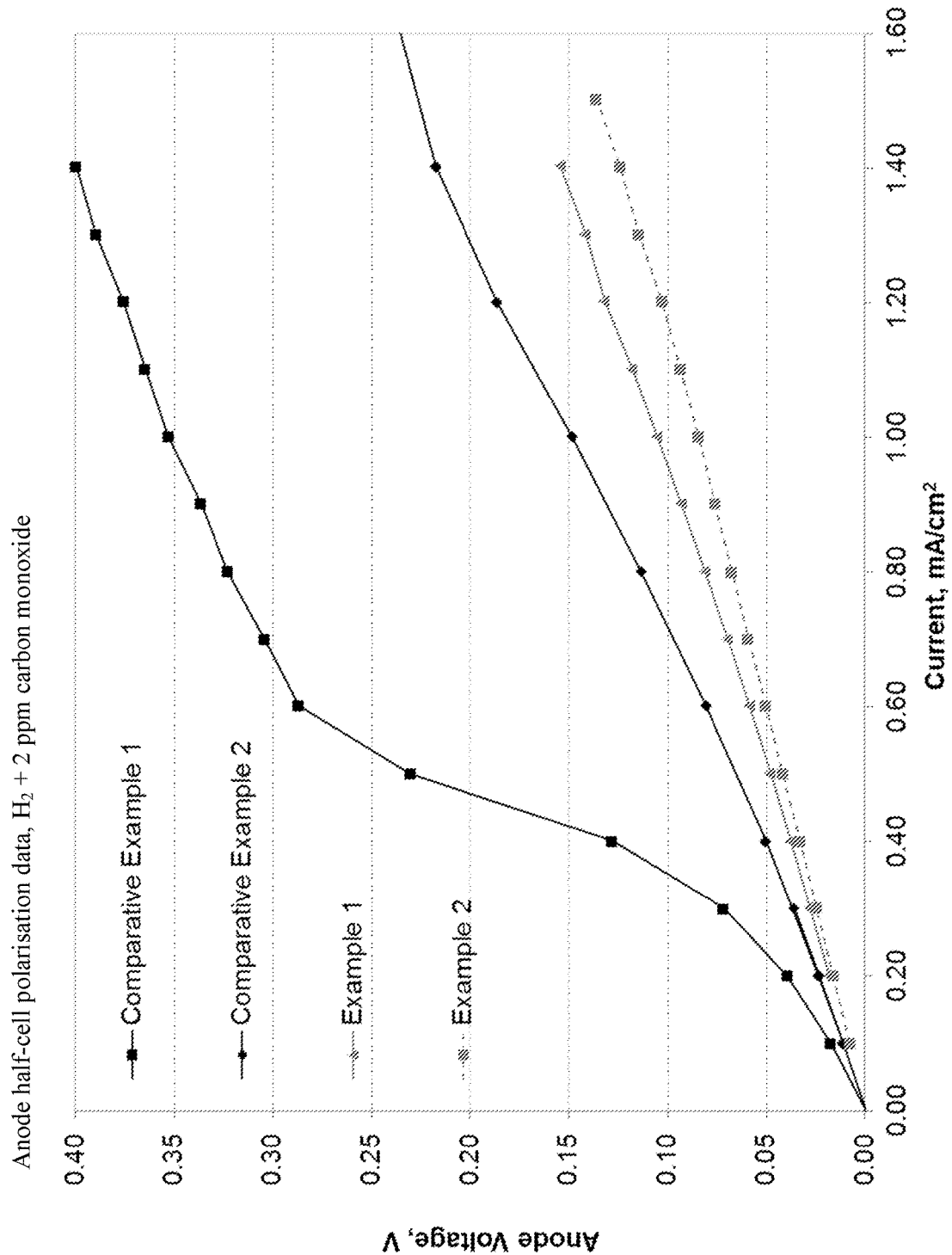

USE OF AN ANODE CATALYST LAYER

FIELD OF THE INVENTION

The present invention relates to the use of an anode comprising a carbon monoxide tolerant catalyst in a proton exchange membrane fuel cell operating on a hydrogen fuel stream containing trace levels of carbon monoxide.

BACKGROUND OF THE INVENTION

In a fuel cell a fuel, which is typically hydrogen or an alcohol, such as methanol or ethanol, is oxidised at a fuel electrode (anode) and oxygen, typically from air, is reduced at an oxygen electrode (cathode) to produce an electric current and form product water. An electrolyte is required which is in contact with both electrodes and which may be alkaline or acidic, liquid or solid.

To assist the oxidation and reduction reactions that take place at the anode and the cathode, catalysts are used. Precious metals, and in particular platinum, have been found to be the most efficient and stable electrocatalyst for fuel cells operating at temperatures below 300° C. The platinum electrocatalyst is typically provided as very small particles (~2-5 nm) of high surface area, which are often, but not always, distributed on and supported by larger macroscopic electrically conductive particles to provide a desired catalyst loading. Conducting carbons are typically the preferred material to support the catalyst.

One type of fuel cell is known as the proton exchange membrane fuel cell (PEMFC) and uses a solid polymer electrolyte membrane which is capable of conducting protons, typically based on perfluorosulphonic acid (PFSA) polymers, such as Du Pont Nafion®. Since these membranes require hydration in order to function, PEMFCs generally operate at temperatures lower than 120° C. The membrane is sandwiched between an anode and a cathode to form a membrane electrode assembly (MEA). For many applications, PEMFCs utilise hydrogen as the fuel source and oxygen, from air, as the oxidant. Impurities in the hydrogen and pollutants in the air can adversely affect the anode and cathode catalyst layers and, in severe cases, permanently damage the MEA. The impurities in hydrogen (carbon monoxide (CO), carbon dioxide, hydrogen sulphide, ammonia, organic sulphur compounds and carbon-hydrogen compounds), arise mainly from the process by which hydrogen is produced. Air pollutants such as nitrogen oxides, sulphur oxides and additional carbon monoxide, carbon dioxide and hydrocarbons, arise mainly from vehicle exhaust and industrial emissions. It has been found that even trace amounts of impurities present in either the fuel or air streams can severely poison the anode, cathode and membrane—particularly at low temperature operation (i.e. <100° C.). Poisoning of any one of these components can result in a performance drop of the MEA. Significant progress has been made in identifying fuel cell contamination sources and understanding the effect of these contaminants on performance. Three major effects have been identified: (1) kinetic effect (poisoning of the electrode catalysts); (2) conductivity effect (increase in the solid electrolyte resistance, including that of the membrane and catalyst layer ionomer), and (3) mass transfer effects (catalyst layer structure and hydrophobicity changes causing a mass transfer problem).

The hydrogen used as a direct fuel in PEMFC technologies is produced by reformation of hydrocarbons and/or oxygenated hydrocarbons, including methane from natural gases and methanol from biomass, and is the dominant method for hydrogen production, although electrolysis is playing an increasing role. The reforming process of hydrogen production results in unavoidable impurities such as carbon oxides including carbon monoxide and carbon dioxide, along with sulphur compounds including hydrogen sulphide and sulphur organics. Steam reforming and partial oxidation or auto-thermal reforming are usually used to produce hydrogen-rich gases known as "reformate" which may contain 25% carbon dioxide, 1-2% carbon monoxide and sulphur impurities in addition to the 70% hydrogen desired. Since hydrogen fuel contaminants can severely hinder PEMFC performance, intensive research activities into the investigation of anode impurities have been conducted. The most extensively studied contaminants are carbon oxides, particularly carbon monoxide, due to the high proportion of hydrogen used in fuel cells being produced through the reforming process.

The problems generated by carbon monoxide in a fuel cell are very well known in the fuel cell community. It is well documented that carbon monoxide binds strongly to platinum sites, resulting in the reduction of surface active sites available for hydrogen adsorption and oxidation. This catalyst poisoning reduces electro-oxidation rates and raises electrode over-potentials, resulting in reduced MEA performance compared to operation under carbon monoxide-free hydrogen. The extent of performance loss due to carbon monoxide poisoning is strongly related to the concentration of carbon monoxide, the exposure time, cell operation temperature and anode catalyst type.

In the case of low level carbon monoxide exposure, poisoning can be reversible through use of an air bleed on the anode, where a small amount of air (1-6%) is injected into the anode gas stream whereby the anode catalyst oxidises carbon monoxide to carbon dioxide in the presence of hydrogen. Although cell performance can be fully recoverable, this is not always the case. Owing to the resulting reduction in fuel efficiency (since fuel is also consumed in this process) and the possible generation of damaging, localised hot-spots, there is increasing resistance from stack manufacturers to use this system measure to prevent/reduce the poisoning effect of carbon monoxide.

An alternative approach to improve the carbon monoxide tolerance of the electrocatalyst is to increase the cell operating temperature. A factor of 20 increase in anode carbon monoxide tolerance has been reported by elevating the cell operating temperature $T_{cell}$>100° C. The capability to run at higher operation temperatures and with higher carbon monoxide levels would enable a reduction in the complexity, size and thus cost of the cooling, balance of plant components. However, high operating temperatures impose a new set of materials challenges, not least increased instability of the platinum and carbon against corrosion, dissolution and sintering mechanisms in addition to the absence of any high-performance membrane that can function effectively without sustained hydration.

A further approach has been the development of an electrocatalyst with improved intrinsic tolerance to carbon monoxide, for example by the design and development of PtRu alloy catalysts. Unfortunately, the use of Ru containing catalysts can also be problematic—particularly over lifetime tests. The oxidation of ruthenium causes its dissolution and, owing to water fluxes in the MEA, solubilised ruthenium can crossover to the cathode. Ruthenium leaching from the anode and deposition on the cathode has a dramatic effect on the oxygen reduction reaction (ORR) activity of the cathode catalyst since ruthenium deposits onto platinum and remains stable on its surface in the electrode potential window of the oxygen reduction reaction.

Due to these operational issues proton exchange membrane fuel cells for use in automotive applications are required to operate on nominally pure hydrogen, since even low levels of carbon monoxide are found to cause poisoning and loss of performance. The US Department of Energy (DoE) has recently published an updated Hydrogen Quality specification which is required for fuel cells employed in the automotive sector. According to this revised specification, only very low levels of carbon monoxide (0.2 µm/mol, or 0.2 ppm) will be present in any future fuel stream. This CO contaminant limit is in agreement with the recently finalised ISO/DIS 14687-2, *Hydrogen Fuel—Product Specification—Part 2: proton exchange membrane (PEM) fuel cell applications for road vehicles*, approved by the International Organization for Standardization (ISO). Even with the continued requirement to reduce the total platinum group metal (PGM) loading of MEAs (which would increase the sensitivity of the electrocatalyst layers to impurities), it was generally thought unlikely that this very low level of carbon monoxide would prove problematic during operation. However, in July 2012 the National Renewable Energy Laboratory (NREL) published the results of a DoE supported study (*National Fuel Cell Electric Vehicle Learning Demonstration, Final Report*) which assessed US fuel cell vehicle technology from 2005 to September 2011. Consideration of the hydrogen production costs and efficiency, production rates and hydrogen quality formed part of this very comprehensive study. Over the six year period 152,000 kg hydrogen was produced or dispensed—from both natural gas reformation and water electrolysis methodologies. The data produced shows that although the carbon monoxide levels in the hydrogen fuel were clearly low, nevertheless levels of up to 1 ppm were measurable.

SUMMARY OF THE INVENTION

Thus, although there is a general consensus in the international fuel cell community that the carbon monoxide level in any future hydrogen fuel source for automotive applications should be a maximum of 0.2 ppm, publically reported data suggests that this is not always achieved. It also remains questionable as to whether such a tight specification is (i) possible for anything other than hydrogen production on site and (ii) to be required in developing countries. Finally, the practicalities of analysing and verifying compliance remain under review.

It is therefore the object of the present invention to provide an anode catalyst layer for use in a proton exchange membrane fuel cell for automotive use, which operates with a nominally pure hydrogen stream i.e. comprising low levels of CO but higher than the 0.2 ppm specification, while minimizing performance losses during operation.

Accordingly, the present invention provides the use of an anode catalyst layer in a proton exchange membrane fuel cell, the anode catalyst layer comprising a carbon monoxide tolerant catalyst material, wherein the catalyst material comprises:
(i) a binary alloy of PtX, wherein X is a metal selected from the group consisting of rhodium and osmium, and wherein the atomic percentage of platinum in the alloy is from 45 to 80 atomic % and the atomic percentage of X in the alloy is from 20 to 55 atomic %; and
(ii) a support material on which the PtX alloy is dispersed;
wherein the total loading of platinum group metals (PGM) in the anode catalyst layer is from 0.01 to 0.2 mgPGM/cm$^2$; and
wherein during operation of the fuel cell a hydrogen stream comprising up to 5 ppm carbon monoxide is fed to the anode catalyst layer.

A further aspect of the present invention provides a method of operating a fuel cell comprising an anode, a cathode and a polymer electrolyte membrane disposed between the anode and the cathode, wherein the anode comprises an anode catalyst layer comprising a carbon monoxide tolerant catalyst material, wherein the catalyst material comprises:
(i) a binary alloy of PtX, wherein X is a metal selected from the group consisting of rhodium and osmium, and wherein the atomic percentage of platinum in the alloy is from 45 to 80 atomic % and the atomic percentage of X in the alloy is from 20 to 55 atomic %; and
(ii) a support material on which the PtX alloy is dispersed;
wherein the total loading of platinum group metals in the anode catalyst layer is from 0.01 to 0.2 mgPGM/cm$^2$; and
wherein said method comprises feeding the anode with a hydrogen stream comprising up to 5 ppm carbon monoxide.

BRIEF DESCRIPTION OF THE DRAWINGS

FIG. 1 is a graph showing the anode half-cell polarisation data in a hydrogen stream comprising 2 ppm carbon monoxide.

DETAILED DESCRIPTION OF THE INVENTION

Preferred and/or option features of the invention will now be set out. Any aspect of the invention may be combined with any other aspect of the invention, unless the context demands otherwise. Any of the preferred or optional features of any aspect may be combined, singly or in combination, with any aspect of the invention, unless the context demands otherwise.

The invention provides the use of an anode catalyst layer in a proton exchange membrane fuel cell. During operation of the fuel cell, a hydrogen stream comprising up to 5 ppm carbon monoxide is fed to the anode. The anode catalyst layer comprises a binary alloy of PtX, wherein X is rhodium or osmium.

By the term "platinum group metals" is meant metals selected from the group ruthenium, rhodium, palladium, osmium, iridium and platinum; in the context of the present invention the metals platinum, rhodium and osmium are specifically intended.

The atomic percentage (atomic %) of platinum in the binary alloy is from 45 to 80 atomic % and of X is from 20 to 55 atomic % (i.e. a ratio of from 0.8:1 to 4:1); suitably the atomic percentage of platinum is from 50 to 75 atomic % and of X is from 25 to 50 atomic % (i.e. a ratio of from 1:1 to 3:1).

In one embodiment, the atomic percentage of platinum is 50 atomic % and of X is 50 atomic % (i.e. a ratio of 1:1).

In a second embodiment, the atomic percentage of platinum is 66.6 atomic % and of X is 33.3 atomic % (i.e. a ratio of 2:1).

In a third embodiment, the atomic percentage of platinum is 75 atomic % and of X is 25 atomic % (i.e. a ratio of 3:1).

In the present context, "atomic %" means atomic percentage, i.e. the percentage based on atoms or moles of the total of platinum and metal X; any additional non-metallic components (e.g. carbon) are not taken into consideration. The atomic percentages given are the nominal atomic percentages that are targeted; in practice when the alloy is made the actual assay may typically be subject to a deviation of ±5% from the nominal atomic percentages.

By the term 'alloy' we mean that there is at least some interaction and incorporation of the metal X into the platinum lattice, but the incorporation is not necessarily uniform throughout the whole alloy particle. The atomic percentage of the metal X in the alloy may be determined by standard procedures known to those skilled in the art; for example by wet chemical analysis digestion of the sample followed by inductively coupled plasma (ICP) emission spectroscopy.

The catalyst material of the invention is a supported catalyst (i.e. the binary alloy is dispersed on a support material). Suitably the amount of the binary alloy is 5-50 wt %, suitably 10-40 wt %, based on the weight of platinum versus the total weight of the supported catalyst (i.e. the binary alloy plus the support material). In a supported catalyst according to the present invention the PtX alloy is suitably dispersed on a conductive high surface area support material, for example a conductive carbon, such as an oil furnace black, extra-conductive black, acetylene black or heat-treated or graphitised versions thereof, or carbon nanofibres or nanotubes. It may also be possible to use a non-conducting support material, such as inorganic metal oxide particles if the catalyst is deposited sufficiently well over the surface to provide the required electronic conductivity or if further additives are included to provide the necessary conductivity. The catalyst of the invention preferably consists essentially of the PtX alloy dispersed on a conductive carbon material. Exemplary carbons include Akzo Nobel Ketjen EC300J (or heat treated or graphitised versions thereof), Cabot Vulcan XC72R (or heat treated or graphitised versions thereof) and Denka Acetylene Black.

To form the anode catalyst layer, the catalyst material is applied directly to one side of a substrate using a range of well-established techniques. The substrate may be a porous gas diffusion layer (to form an anode electrode) or a proton exchange membrane (to form a catalyst coated membrane). Alternatively, the anode catalyst layer may be applied to a decal transfer substrate, the anode catalyst layer subsequently being transferred from the decal transfer substrate to a gas diffusion layer or proton exchange membrane by techniques known to those skilled in the art. The decal transfer substrate may be any suitable transfer substrate known to those skilled in the art but is preferably a polymeric material such as polytetrafluoroethylene (PTFE), polyimide, polyvinylidene difluoride (PVDF), or polypropylene (especially biaxially-oriented polypropylene, BOPP) or a polymer-coated paper such as polyurethane coated paper. The transfer substrate could also be a silicone release paper or a metal foil such as aluminium foil.

The catalyst material is formulated into an ink, comprising an aqueous and/or organic solvent, and a solution form of a proton conducting polymer (e.g. as disclosed in EP 0 731 520) and deposited onto either the substrate or decal transfer substrate using well known techniques, such as spraying, printing and doctor blade methods. The catalyst material is applied to the substrate or decal transfer substrate to provide an anode catalyst layer having a PGM loading of 0.01 to 0.2 mgPGM/cm$^2$, suitably 0.01 to 0.15 mgPGM/cm$^2$ and preferably 0.01 to 0.1 mgPGM/cm$^2$.

Typical gas diffusion layers, suitable for use as the substrate onto which the anode catalyst layer is applied, are fabricated from gas diffusion substrates based on carbon paper (e.g. Toray® paper available from Toray Industries, Japan or U105 or U107 paper available from Mitsubishi Rayon, Japan), woven carbon cloths (e.g. the MK series of carbon cloths available from Mitsubishi Chemicals, Japan) or non-woven carbon fibre webs (e.g. AvCarb series available from Ballard Power Systems Inc., Canada; H2315 series available from Freudenberg FCCT KG, Germany; or Sigracet® series available from SGL Technologies GmbH, Germany). The carbon paper, cloth or web is typically modified with a particulate material either embedded within the layer or coated onto the planar faces, or a combination of both to produce the final gas diffusion layer. The particulate material is typically a mixture of carbon black and a polymer such as polytetrafluoroethylene (PTFE). Suitably the gas diffusion layers are between 100 and 400 µm thick. Preferably there is a layer of particulate material such as carbon black and PTFE on the face of the gas diffusion layer that contacts the catalyst material. The formed anode electrode (gas diffusion layer plus anode catalyst layer) is subsequently combined with a proton exchange membrane and a cathode electrode to form a membrane electrode assembly (MEA) by methods known to those skilled in the art.

The proton exchange membrane may be any membrane suitable for use in a PEM fuel cell, for example the membrane may be based on a perfluorinated sulphonic acid ionomer such as Nafion® (DuPont), Flemion® (Asahi Glass), Aciplex® (Asahi Kasei) and Aquivion™ (Solvay Plastics); these membranes may be used unmodified, or may be modified to improve the high temperature performance, for example by incorporating an additive. Alternatively, the membrane may be based on a sulphonated hydrocarbon membrane such as those available from FuMA-Tech GmbH as the Fumapem® P, E or K series of products, JSR Corporation, Toyobo Corporation, and others. The membrane may be a composite membrane, containing the proton-conducting material and other materials that confer properties such as mechanical strength. For example, the membrane may comprise one or more expanded PTFE layers.

Typical membranes onto which the anode catalyst layer is applied to form a catalyst coated membrane include the proton exchange membranes listed above. The formed catalyst coated membrane is subsequently combined with an anode gas diffusion layer and a cathode gas diffusion layer by methods known to those skilled in the art to form a membrane electrode assembly. Suitably gas diffusion layers included those listed hereinbefore.

The anode catalyst layer may further comprise additional components, for example a second catalyst, such as an oxygen evolution catalyst. Examples of such catalysts are known to those in the art.

Further aspects of the invention provide the use of an anode electrode, a catalyst coated membrane or a membrane electrode assembly in a proton exchange membrane fuel cell, wherein the anode electrode, catalyst coated membrane or membrane electrode assembly comprise an anode catalyst layer comprising a carbon monoxide tolerant catalyst material, wherein the catalyst material comprises:

(i) a binary alloy of PtX, wherein X is a metal selected from the group consisting of rhodium and osmium, and wherein the atomic percentage of platinum in the alloy is from 45 to 80 atomic % and the atomic percentage of X in the alloy is from 20 to 55 atomic %; and (ii) a support material on which the PtX alloy is dispersed; wherein the total loading of platinum group metals (PGM) in the anode catalyst layer is from 0.01 to 0.2 mgPGM/cm$^2$; and wherein during operation of the fuel cell a hydrogen stream comprising up to 5 ppm carbon monoxide is fed to the anode catalyst layer.

The invention will now be described in more detail with reference to the following examples, which are illustrative and not limiting of the invention.

General Method for the Preparation of the Catalyst Material for Examples 1 to 3

Carbon black was dispersed in water using a shear mixer and transferred to a reaction vessel. Solid $NaHCO_3$ or 1M NaOH was added. Subsequently, a mixed solution of the rhodium salt or the osmium salt and $H_2PtCl_6$ was added. When deposition of the metals was complete the catalyst was recovered by filtration and washed on the filter bed with demineralised water until free of soluble ions. The material was dried and then annealed at high temperature in an inert atmosphere.

Example 1

$Pt_{75}Rh_{25}$
Ketjen EC300J 5 g
Pt 4.25, 21.7 mmol as $H_2PtCl_6$ (16.88 g, 25.18% Pt)
Rh 0.75 g, 7.3 mmol as $RhCl_3$ (1.8 g, 41.44% Rh)
$NaHCO_3$ (14 g, 0.167 mol) 10% excess
Annealing temperature: 500° C. for 30 minutes Example 2

$Pt_{50}Rh_{50}$
$H_2PtCl_6$ solution (24.88% Pt)=65.83 g (16.38 g, 0.0840 mmol Pt)
$RhCl_3$ (42.40% Rh)=20.39 g (8.64 g, 84 mmol Rh)
KetjenEC300J (9.8% moisture)=27.70 g (24.99 g dry)
$NaHCO_3$=69.82 g (0.8312 mol)
Annealing temperature: 500° C. for 30 minutes Example 3

$Pt_{75}Os_{25}$
$H_2PtCl_6$=6.0 g (1.5 g, 0.0769 mol Pt)
$Na_2OsCl_6$=1.18 g (0.50 g, 0.0263 mol Os)
1M NaOH=As required
Ketjen EC 300J (2.8% moisture)=4.1 g
Annealing temperature: 500° C. for 2 hours.

Comparative Example 1

The Pt catalyst used was HiSPEC® 2000 available from Johnson Matthey Fuel Cells Limited.

Comparative Example 2

The PtRu catalyst used was HiSPEC® 10000 available from Johnson Matthey Fuel Cells Limited.

Preparation of Catalyst Coated Membrane (CCM)

A dispersion comprising 0.5 g of Example 1 and sufficient aqueous Nafion solution (11% solids) to target a 120% dry Nafion weight with respect to the catalyst support material weight was shear-mixed to form an ink. The process was repeated using Example 2 and Comparative Examples 1 and 2.

Using the inks obtained above, anode catalyst layers with platinum loadings as detailed in Table 1 were formed on one side of a 17 μm reinforced PFSA membrane. A cathode catalyst layer comprising HiSPEC® 9100 (commercially available from JMFCL) and 120% Nafion (with respect to the carbon support material weight) and having a platinum loading of 0.4 $mgPt/cm^2$ was formed on the other side of the membrane to produce a (CCM).

MEA Testing

The CCMs were combined with anode and cathode gas diffusion layers without hot bonding to form the MEA. MEA testing was conducted at 80° C., 7.2 psig with fully humidified gas reactants. Anode polarisation curves, obtained by feeding $H_2$ to the cathode electrode, were obtained using (i) pure $H_2$, (ii) 5 ppm carbon monoxide in $H_2$, and (iii) 2 ppm carbon monoxide in $H_2$ supplied to the anode electrode.

The electrochemical areas of each of the anode electrocatalyst were measured using CO stripping voltammetry using conventional methods.

Table 1 provides details of the catalyst materials, loading of the catalyst in the anode, the electrochemical area and performance (mV) at a current of 1 $A/cm^2$ for half cells operating on pure $H_2$, 2 ppm carbon monoxide in $H_2$ and 5 ppm carbon monoxide in $H_2$. The half-cell polarisation curve for 2 ppm carbon monoxide in $H_2$ over the complete current range tested is given in FIG. 1.

From Table 1, it can be seen that while there is relatively little difference in the performance of the catalysts of the invention and the comparative examples when operating on $H_2$, the catalysts of the invention show improved half-cell performance (i.e. lower anode overpotential or voltage) when compared to the Comparative Examples when carbon monoxide is introduced into the $H_2$ stream. It is also seen that although there is a variation in the catalyst surface area between the Examples (see Electrochemical Area); there is no direct correlation between the catalyst surface area on the tolerance to carbon monoxide. Thus, a clear benefit from the alloy catalysts is observed.

FIG. 1 gives the anode polarisation curves of the Examples and Comparative Examples when operating under $H_2$+2 ppm carbon monoxide. Significant performance losses (higher anode voltages) are observed for both of the Comparative Examples (Pt and PtRu) owing to the adverse impact of carbon monoxide on the electrocatalyst. In contrast, all Examples of the invention show a much lower half-cell voltage (overpotential) when compared to the Comparative Examples, indicating that the carbon monoxide present in the hydrogen fuel stream is having less of a poisoning effect on these electrocatalysts.

TABLE 1

| Example No | Catalyst Material | Wt % loading of Pt on catalyst support | Loading of PGM in anode (mgPGM/$cm^2$) | Electrochemical Area ($m^2$/g PGM) | Performance @ 1 A/$cm^2$ mV, half cell | | |
|---|---|---|---|---|---|---|---|
| | | | | | $H_2$ | 2 ppm carbon monoxide | 5 ppm carbon monoxide |
| Comparative Example 1 | Pt | 10 | 0.1 | 70.6 | 75 | 353 | a |

TABLE 1-continued

| Example No | Catalyst Material | Wt % loading of Pt on catalyst support | Loading of PGM in anode (mgPGM/cm$^2$) | Electrochemical Area (m$^2$/g PGM) | Performance @ 1 A/cm$^2$ mV, half cell | | |
|---|---|---|---|---|---|---|---|
| | | | | | H$_2$ | 2 ppm carbon monoxide | 5 ppm carbon monoxide |
| Comparative Example 2 | PtRu | 40 | 0.08 | 82.8 | 70 | 148 | $a$ |
| Example 1 | Pt$_3$Rh | 40 | 0.093 | 115.4 | 60 | 105 | 260 |
| Example 2 | PtRh | 30 | 0.094 | 76.8 | 81 | 85 | 119 |

$a$It was not possible to obtain a value for Pt and PtRu when operating on 5 ppm carbon monoxide in H$_2$ as the degree of poisoning by carbon monoxide was such that highly unstable, i.e. non-equilibrium, voltages were observed.

The invention claimed is:

1. A method of operating a fuel cell comprising an anode, a cathode and a polymer electrolyte membrane disposed between the anode and the cathode, wherein said method comprises feeding the anode with an impure hydrogen stream comprising low levels of carbon monoxide up to 5 ppm, and wherein the anode comprises an anode catalyst layer comprising a carbon monoxide tolerant catalyst material, wherein the catalyst material comprises:
(i) a binary alloy of PtX, wherein X is osmium metal, and wherein the atomic percentage of platinum in the alloy is from 45 to 75 atomic % and the atomic percentage of X in the alloy is from 25 to 55 atomic %; and
(ii) a support material on which the PtX alloy is dispersed; wherein the total loading of platinum group metals (PGM) in the anode catalyst layer is from 0.01 to 0.2 mgPGM/cm$^2$.

2. The method according to claim 1, wherein X is Os.

3. The method according to claim 2, wherein the atomic percentage of Pt in the binary alloy is from 50 to 75 atomic % and the atomic percentage of X is from 25 to 50 atomic %.

4. The method according to claim 2, wherein the amount of platinum in the supported catalyst is 10-50 wt % of the total weight of the binary alloy plus support material.

5. The method according to claim 2, wherein the anode further comprises a second catalyst.

6. The method according to claim 5, wherein the second catalyst is an oxygen evolution catalyst.

7. The method according to claim 1, wherein the atomic percentage of Pt in the binary alloy is from 50 to 75 atomic % and the atomic percentage of X is from 25 to 50 atomic %.

8. The method according to claim 7, wherein the amount of platinum in the supported catalyst is 10-50 wt % of the total weight of the binary alloy plus support material.

9. The method according to claim 7, wherein the anode further comprises a second catalyst.

10. The method according to claim 9, wherein the second catalyst is an oxygen evolution catalyst.

11. The method according to claim 1, wherein the amount of platinum in the supported catalyst is 10-50 wt % of the total weight of the binary alloy plus support material.

12. The method according to claim 11, wherein the anode further comprises a second catalyst.

13. The method according to claim 12, wherein the second catalyst is an oxygen evolution catalyst.

14. The method according to claim 1, wherein the anode further comprises a second catalyst.

15. The method according to claim 14, wherein the second catalyst is an oxygen evolution catalyst.

\* \* \* \* \*